H. SCHMIDT.
NUT LOCK.
APPLICATION FILED MAR. 13, 1911.

997,095.

Patented July 4, 1911.

2 SHEETS—SHEET 1.

WITNESSES
Robert M. Sutphen
E. W. Cady

INVENTOR
Henry Schmidt
By E. E. Vrooman
his Attorney.

H. SCHMIDT.
NUT LOCK.
APPLICATION FILED MAR. 13, 1911.
997,095.
Patented July 4, 1911.
2 SHEETS—SHEET 2.
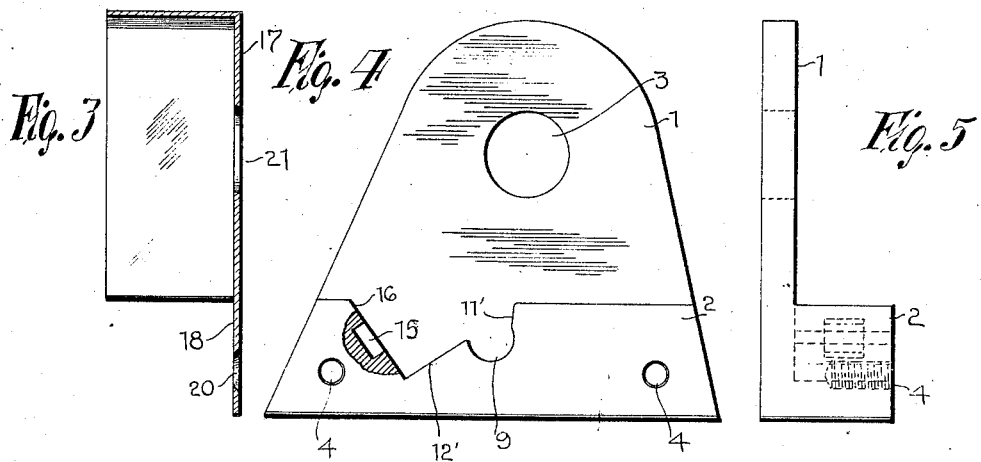
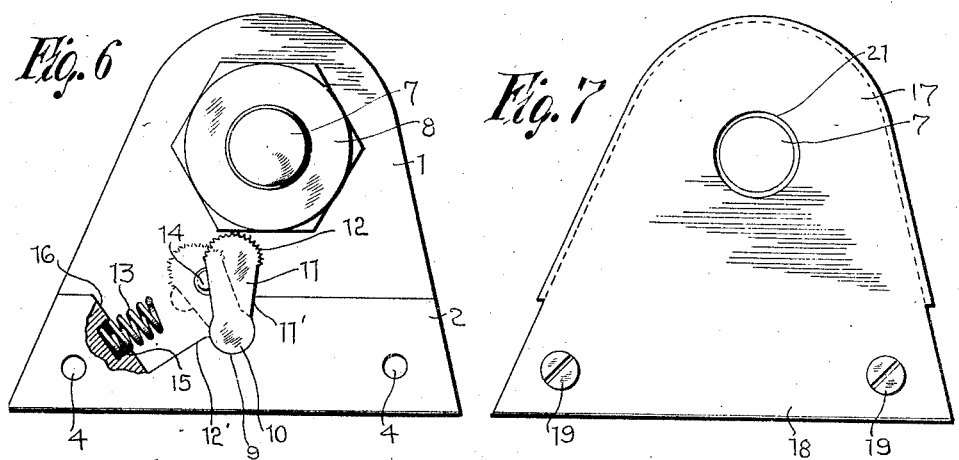
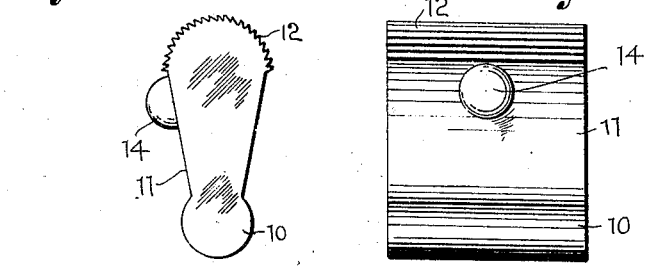
WITNESSES
Robert M. Sutphen
E. W. Cady
INVENTOR
HENRY SCHMIDT
By E. E. Vroom
his Atty

UNITED STATES PATENT OFFICE.

HENRY SCHMIDT, OF APPLETON, WISCONSIN.

NUT-LOCK.

997,095.   Specification of Letters Patent.   Patented July 4, 1911.

Application filed March 13, 1911. Serial No. 614,148.

*To all whom it may concern:*

Be it known that I, HENRY SCHMIDT, a citizen of the United States, residing at Appleton, in the county of Outagamie and State of Wisconsin, have invented certain new and useful Improvements in Nut-Locks, of which the following is a specification, reference being had therein to the accompanying drawing.

This invention relates to nut locks and has special reference to nut locks used in connection with rail joints.

The invention has for its object to provide an improved nut lock which will readily and effectively hold the nut in locked position and which may be easily and readily released when it is desired to remove the nut.

The invention further has for its object to provide a lock nut which will be protected against the accumulation of dirt, and thereby prevented from being clogged up.

Figure 1:
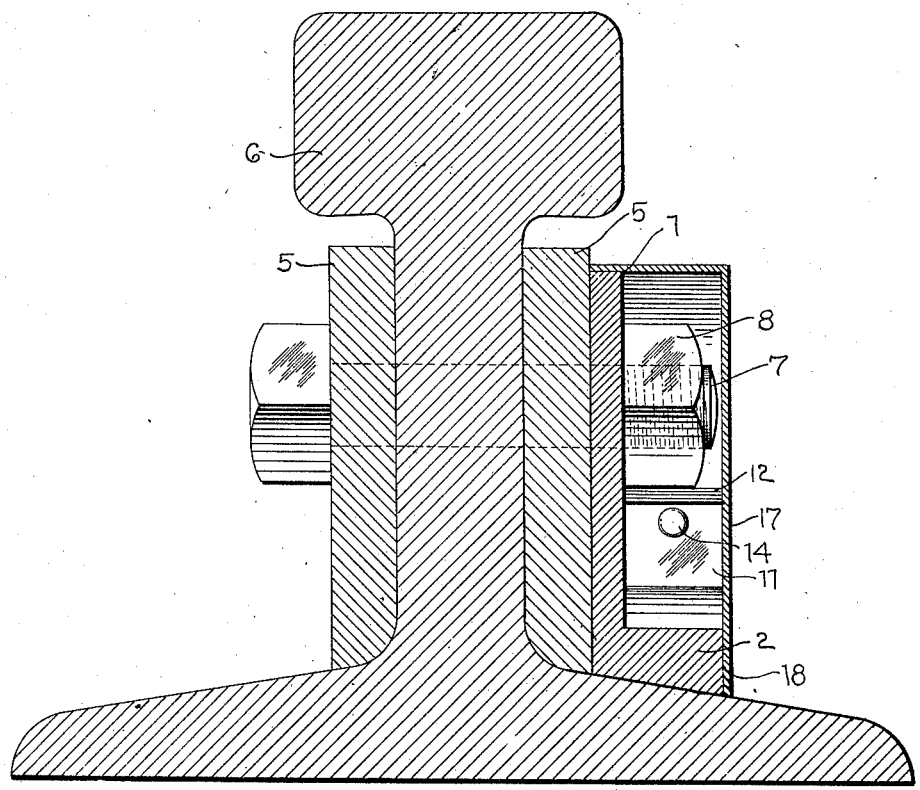
Figure 2:
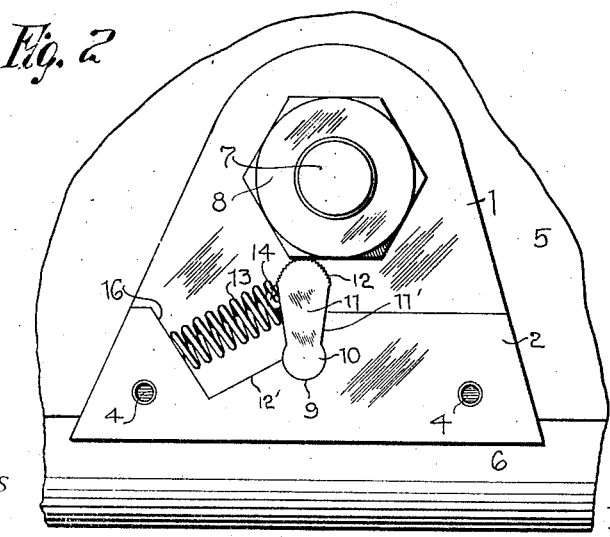

Referring to the accompanying drawings:—Figure 1 is a view in cross section of a railroad rail joint with a nut lock secured thereto constructed in accordance with this invention. Fig. 2 is a fragmentary side view of the rail joint shown in Fig. 1 with the casing inclosing the nut lock removed. Fig. 3 is a detail view in cross section of the casing to inclose the nut lock. Fig. 4 is a detail view of a metallic plate employed in the construction of the nut lock. Fig. 5 is a detail side view of the plate shown in Fig. 4. Fig. 6 is a face view of the plate shown in Fig. 4 partly broken away, and showing a nut mounted on a bolt and held in locked position. Fig. 7 is a face view of the casing inclosing the nut lock. Fig. 8 is an enlarged detail end view of the locking pawl used to lock the nut. Fig. 9 is a face view of the locking pawl shown in Fig. 8.

In carrying out this invention a plate 1 is provided which is adapted to extend above the flange of a rail to a point adjacent to the top of the fish plate against which said plate abuts and is preferably formed with an oval top and tapering sides, as shown, thereby providing a saving in metal and forming a broad base having a lateral enlarged base portion 2 which is seated upon the flange of the rail. The plate 1 is formed with a bolt hole 3 and with screw holes 4 in its base portion adjacent to the corners thereof, said plate 1 lying against one of the fish plates 5 of a rail 6. A bolt 7 extends through said fish plates and the web of the rail and through the hole 3 in the plate 1, and is secured in place by a nut 8. In order to lock the nut in position after it has been screwed up on the bolt 7 tightly against the plate 1, the portion 2 of the plate 1 is provided with a locking pawl pivotally mounted thereon and preferably, as shown, by means of a curved socket 9 in the base portion 2 in which is seated and adapted to rock the curved head 10 of the pawl 11, and which, as here shown, consists of a plate of metal having its upper edge preferably formed with teeth or serrations 12 adapted to swing into engagement with and bite into one side of the nut 8. The normal position of the pawl 11 is vertical, as shown in Figs. 2 and 6, one side of the pawl bearing against a shoulder 11' in the base portion 2. The base portion 2 on the other side of the socket 9 is cut away at an incline 12', so as to permit the pawl to swing away from the nut to the position shown in dotted lines in Fig. 6. In order to hold the pawl in position and yet permit it to yield laterally when the nut is screwed up on the bolt, a spring connection is provided therefor which, as here shown, consists of a coil spring 13 having one end bearing against and held in place by suitable means, as for example, the knob 14 on the pawl 11 and its other end resting in a socket 15 in the inclined shouldered portion 16 of the base 2. By means of this construction when the nut is screwed up on the bolt the pawl will yield laterally as aforesaid, and compress the spring 13, and, at the same time, when the nut has been screwed up as tightly as possible the spring 13 will hold the teeth 12 of the pawl 11 in biting engagement with the side of the nut, as shown in Figs. 2 and 6, and any tendency of the nut to unscrew from the bolt and become loose is prevented by the side of the nut bearing against the toothed end of the pawl and holding the latter tightly against the shouldered portion 11' of the base 2 thereby preventing the nut from becoming loose.

In order to protect the nut lock from dust and from becoming clogged up with dirt, a sheet metal casing 17 is provided which conforms to the shape of the plate 1 and fits over the same and has an extension 18 at its bottom adapted to lie against the base 2 of the plate 1 and to be secured thereto by means of screws 19 which extend through holes 20 in the extension 18 and engage the screw holes 4 in the plate 1. The casing 17 is provided with a hole 21 in alinement with the end of the bolt 7 so as to provide for the projecting end of the bolt which may pass through the same and permit the casing to be brought over the nut lock as closely as possible.

It will be seen that by means of this invention a simple and effective nut lock is provided which will not readily get out of order and which locks the nut securely in position and holds it from becoming loose.

When it is desired to remove the nut from the bolt, the nut is unlocked by knocking the pawl 11 laterally out of engagement with the nut, which may be readily done by means of a suitable tool.

Having thus described the invention, what I claim is:—

1. A nut lock comprising a railroad rail, a pair of fish plates, a bolt extending through said rail and fish plates, a plate detachably mounted on said bolt and bearing against one of said fish plates, a nut mounted on said bolt and bearing against said plate, and a pawl having a serrated end movable into and out of engagement with one side of said nut.

2. A nut lock comprising a railroad rail, a pair of fish plates, a bolt extending through said rail and fish plates, a plate detachably mounted on said bolt and bearing against one of said fish plates, a nut mounted on said bolt and bearing against said plate, a pawl having a serrated end, and a spring serving to hold said pawl in engagement with said nut.

3. A nut lock comprising a railroad rail, a pair of fish plates, a bolt extending through said rail and fish plates, a plate detachably mounted on said bolt and bearing against one of said fish plates, a nut mounted on said bolt and bearing against said plate, a pawl pivotally mounted in said plate beneath said nut and having a serrated end movable into and out of engagement with one side of said nut, and a coil spring normally holding said pawl against said nut to lock the same and permitting the pawl to yield and move away from the nut when the latter is screwed up on the bolt.

4. A nut lock comprising a railroad rail, a pair of fish plates, a bolt extending through said rail and fish plates, a plate detachably mounted on said bolt and bearing against one of said fish plates, and having a laterally projecting base portion resting upon the flange of the rail, a vertical pawl seated in said laterally projecting portion of said plate and bearing against a shoulder in said plate and having a serrated upper end adapted to engage the nut, and a coil spring bearing against said laterally projecting portion of the plate at one end and against the pawl at its other end.

5. A nut lock consisting of a rail, a pair of fish plates, a bolt extending through said rail and fish plates, a plate detachably mounted on said bolt and bearing against one of said fish plates and having a laterally projecting base portion resting against the flange of the rail with a curved socket and a shoulder at one side projecting from said socket, and a recessed portion on the opposite side of said socket, a pawl having a rounded end seated in said socket and having a beveled upper end normally located beneath the nut, and adapted to engage one side of the same, and a coil spring located in said recess in the base portion and having one end bearing against one side of said pawl to hold it in locked position with said nut.

In testimony whereof I hereunto affix my signature in presence of two witnesses.

HENRY SCHMIDT.

Witnesses:
 HENRY SCHLIMM,
 CHRISTIAN SCHMIDT.